United States Patent [19]

Valko

[11] 4,423,168
[45] Dec. 27, 1983

[54] RESINOUS COMPOSITIONS CURABLE THROUGH A TRANSESTERIFICATION CURING MECHANISM

[75] Inventor: Joseph T. Valko, Gibsonia, Pa.

[73] Assignee: PPG Industries, Inc., Pittsburgh, Pa.

[21] Appl. No.: 288,241

[22] Filed: Jul. 29, 1981

[51] Int. Cl.$^3$ .............................................. C08L 63/02
[52] U.S. Cl. ................................ 523/414; 204/181 C; 523/402; 523/410; 523/417; 523/420; 524/543; 524/601; 524/901; 525/328.8; 525/444; 525/533; 528/113
[58] Field of Search ............... 523/402, 414, 418, 417, 523/420, 426; 525/533, 328.8, 444; 524/901, 543, 601; 204/181 C

[56] References Cited

U.S. PATENT DOCUMENTS

| | | | |
|---|---|---|---|
| 3,937,679 | 2/1976 | Bosso et al. | 260/29.3 |
| 4,101,486 | 7/1978 | Bosso et al. | 260/29.2 TN |
| 4,307,153 | 12/1981 | Bernelin et al. | 428/413 |
| 4,332,711 | 6/1982 | Kooymans et al. | 524/539 |

FOREIGN PATENT DOCUMENTS

| | | |
|---|---|---|
| 8262 | 2/1980 | European Pat. Off. . |
| 12463 | 6/1980 | European Pat. Off. . |
| 40867 | 12/1981 | European Pat. Off. . |
| 739701 | 11/1955 | United Kingdom . |
| 1283653 | 8/1972 | United Kingdom . |
| 1525331 | 9/1978 | United Kingdom . |
| 1531046 | 11/1978 | United Kingdom . |

OTHER PUBLICATIONS

J. Prakt. Chem. 312 1970, pp. 660–668, "On the Chemistry of Metal-Ion Catalyzed Transesterification Reactions" by H. Zimmermann and E. Schaaf.

*Primary Examiner*—Theodore E. Pertilla
*Attorney, Agent, or Firm*—William J. Uhl

[57] ABSTRACT

Coating compositions comprising a polymeric polyol with a polyester crosslinking agent having at least two beta-amido ester groups per molecule are disclosed. The compositions, when applied to a substrate and cured in the presence of a transesterification catalyst, give solvent-resistant coatings.

9 Claims, No Drawings

RESINOUS COMPOSITIONS CURABLE THROUGH A TRANSESTERIFICATION CURING MECHANISM

CROSS-REFERENCE TO COPENDING APPLICATIONS

Application Ser. No. 288,238, filed even date herewith discloses coating compositions which are heat-curable to give solvent-resistant coatings comprising a polymeric polyol, a polyester crosslinking agent having at least two beta-alkoxyester groups per molecule and a transesterification catalyst.

Application Ser. No. 288,239, filed even date herewith discloses coating compositions which are heat-curable to give solvent-resistant coatings comprising a polymeric polyol, a crosslinking agent having at least two gamma- and/or delta-hydroxyester groups per molecule and a transesterification catalyst.

Application Ser. No. 288,240, filed even date herewith discloses coating compositions which are heat-curable to give solvent-resistant coatings comprising a polymeric polyol, a crosslinking agent having at least two beta- and/or gamma-ester-ester groups per molecule and a transesterification catalyst.

BACKGROUND OF THE INVENTION

1. Field of the Invention

The present invention relates to heat-curable resinous coating compositions and to the use of these coating compositions in cationic electrodeposition. More particularly, the present invention relates to resinous coating compositions which cure through a transesterification reaction.

2. Brief Description of the Prior Art

U.S. Pat. No. 3,937,679 discloses cationic heat-curable resinous coating compositions such as hydroxyl group-containing polymers in combination with aminoplast resin curing agents. These compositions can be used in an electrodeposition process where they coat out on the cathode, and when cured, produce coatings with excellent properties. Coating compositions using aminoplast cure best in an acidic environment. However, the deposit on the cathode is basic and high curing temperature must be used to overcome the unfavorable curing environment.

U.S. Pat. No. 4,101,486 is similar to U.S. Pat. No. 3,937,679 in that it discloses cationic electrodeposition of hydroxyl group-containing polymers, however, the curing agent is a blocked isocyanate. Coating compositions using blocked isocyanates cure very well at relatively low temperatures in a basic environment and are today widely used in industrial cationic electrodeposition. Examples of cationic electrodepositable compositions which are used industrially are those described in U.S. Pat. Nos. 4,031,050 and 4,190,564 and DE-OS No. 2,752,255. Although used extensively throughout the electrodeposition industry, blocked isocyanate-containing compositions are undesirable from the point of view of the isocyanate, some of which are undesirable to handle.

European Patent Application 0012463 discloses thermosetting resinous coating compositions which cure through a transesterification reaction. The resinous binder of the coating composition comprises a hydroxyl-containing polymer and a crosslinking agent which is a polyester containing two or more beta-hydroxyester groups per molecule. The coating composition can be made cationic and used for electrodeposition.

It is known in the art that esters containing beta-hydroxyalkyl groups tranesterify very quickly. See, for example, J. PRAKT. CHEM. 312 (1970), 660–668. However, European Patent Application 0012463 discloses that polyesters which do not contain beta-hydroxyester groups but rather simple ester groups such as methyl esters or butyl esters do not transesterify as readily and are too sluggish to effect sufficient crosslinking at acceptable conditions.

Surprisingly, it has been found that coating compositions comprising hydroxyl group-containing polymers and a polyester crosslinking agent which do not contain beta-hydroxyester groups can be cured quite effectively.

SUMMARY OF THE INVENTION

In accordance with this invention, a coating composition which is heat curable to give a solvent-resistant coating is provided. The coating composition comprises as the resinous binder:
 (A) a polymeric polyol,
 (B) a polyester crosslinking agent having at least two beta-amido ester groups per molecule,
 (C) a transesterification catalyst.

The coating compositions can be made cationic in character such as by using a polymeric polyol which contains cationic salt groups, the resinous binder dispersed in water and the aqueous dispersion used in a method of cationic electrodeposition.

DETAILED DESCRIPTION

The polymeric polyol component of the coating compositions can be selected from a wide variety of hydroxyl group-containing polymers such as alkyd resins, polyester resins, hydroxyl group-containing acrylic polymers, hydroxyl group-containing epoxy resins and hydroxyl group-containing resins which are derived from epoxy resins such as polyepoxide-amine adducts.

The molecular weights of the polymeric polyols can vary over a wide range depending upon their type and on whether the coating composition is organic solvent based or aqueous based and also on the desired performance characteristics of the coating. Polyester, epoxy and alkyd resins can have molecular weights as low as about 500 and as high as about 10,000, preferably the molecular weights are usually in the range of about 1,000 to 5,000; the molecular weights being on a weight average basis relative to polystyrene, as determined by gel permeation chromatography. Acrylic polymers, on the other hand, can have molecular weights as high as about 100,000, and usually will be in the range of about 5,000 to 50,000 on a weight average basis relative to polystyrene, as determined by gel permeation chromatography.

The hydroxyl content of the polymeric polyol should be sufficient such that when the polyol is in combination with the curing agent, the composition will cure to a solvent-resistant coating. Generally, the hydroxyl number of the polymeric polyol will be at least about 170 and preferably will be in the range of about 180 to 300, based on resin solids.

A preferred class of polymeric polyols are hydroxyl group-containing epoxy resins or resins which are derived from epoxy resins such as polyepoxide-amine adducts which are particularly preferred. The epoxy resins which can be used in the practice of the invention are polyepoxides, that is, polymers having a 1,2-epoxy equivalency greater than 1, preferably about 2 or more. Preferred are polyepoxides which are difunctional with regard to epoxy. The preferred polyepoxides are polyglycidyl ethers of cyclic polyols. Particularly preferred are polyglycidyl ethers of polyphenols such as bisphenol A. Examples of polyepoxides are given in U.S. Pat. No. 4,260,716, column 3, line 20, to column 4, line 30, the portions of which are hereby incorporated by reference.

Besides the epoxy resins disclosed above, other epoxy-containing polymers which can be used are acrylic polymers which contain epoxy groups. These polymers are formed by polymerizing an unsaturated epoxy group-containing monomer such as glycidyl acrylate or methacrylate with one or more other polymerizable ethylenically unsaturated monomers. Examples of these polymers are described in U.S. Pat. No. 4,001,156, column 3, line 59, to column 5, line 60, the portions of which are hereby incorporated by reference.

Besides the hydroxyl group-containing epoxy resins disclosed above, hydroxyl group-containing polymers derived from epoxy resins such as polyepoxide-amine adducts can also be used. Examples of amines are ammonia, primary, secondary and tertiary amines and mixtures thereof. The reaction product of the polyepoxide and the amine can be at least partially neutralized with an acid to form a polymeric product containing amine salt and/or quaternary ammonium salt groups. Reaction conditions of polyepoxides with amines, examples of various amines and at least partial neutralization with acid are disclosed in U.S. Pat. No. 4,260,720, column 5, line 20, to column 7, line 4, the portions of which are hereby incorporated by reference.

Also, various polyepoxide-amine adducts are described in European Patent Application No. 0012463.

With regard to the amount of organic amine and polyepoxide which are reacted with one another, the relative amounts depend upon the extent of cationic salt group formation desired and this in turn will depend upon the molecular weight of the polymer. The extent of cationic salt group formation and the molecular weight of the reaction product should be selected such that when the cationic polymer is mixed with aqueous medium, a stable dispersion will form. A stable dispersion is one which does not settle or is one which is easily dispersible if some sedimentation occurs. In addition, the dispersion should be of sufficient cationic character that the dispersed resin particles will migrate towards the cathode when an electrical potential is impressed between an anode and a cathode immersed in aqueous dispersion.

Also, the molecular weight, structure and extent of cationic salt group formation should be controlled such that the dispersed resin will have the required flow to form a film on the substrate; in the case of electrodeposition, to form a film on the cathode. The film should be insensitive to moisture to the extent that it will not redissolve in the electrodeposition bath or be rinsed away from the coated surface after removal from the bath.

In general, most of the cationic polymers useful in the practice of the invention will have average molecular weights within the range of about 500–100,000 and contain from about 0.1 to 10, preferably about 0.1 to 5.0, preferably from about 0.3 to 3.0 milliequivalents of cationic group per gram of resin solids. Obviously one must use the skill in the art to couple the molecular weight with the cationic group content to arrive at a satisfactory polymer. The preferred polyglycidyl ethers will have molecular weights of about 500 to 10,000, more preferably 1000 to 5,000. Acrylic polymers, on the other hand, will have molecular weights as high as 100,000, preferably 5,000 to 50,000.

Besides epoxy resins and resins derived from epoxy resins, other hydroxyl group-containing polymers such as alkyd resins, polyester resins and hydroxyl group-containing acrylic polymers can also be used in the practice of the invention. Examples of these polymers and their cationic electrodepositable derivatives are shown, for example, in British Pat. No. 1,303,480 (hydroxyl group-containing acrylic polymers and polyesters) and British Pat. No. 1,159,390 (hydroxyl group-containing acrylic polymers).

Besides the cationic polymers which are designed to form aqueous-based coating compositions which may be used in coating applications such as electrodeposition, it should also be appreciated that organic solvent-based coatings employing the above polymers without cationic salt groups can also be used. Formulating coating compositions with such polymers is well known in the art and need not be described in any further detail.

The crosslinking agent of the coating composition is a polyester containing at least two beta-amido ester groups per molecule. Preferably, the polyester is substantially free of polyesters containing more than one beta-hydroxyester group per molecule. By substantially free is meant the beta-hydroxyester groups are present in amounts less than that sufficient to achieve a cured coating by themselves, i.e., a coating which can withstand 40 acetone double rubs as described infra. In general, the beta-hydroxyester groups will be present in amounts less than 5 and preferably less than 2 percent by weight calculated as weight of beta-hydroxyester group per total weight of crosslinker. Usually, the crosslinkers of the present invention are completely free of beta-hydroxyester groups. Examples of suitable crosslinking agents are those which are formed from reacting a polycarboxylic acid or its functional equivalent thereof with one or more beta-hydroxyalkylamides to form the polyester containing at least two beta-alkoxy-amido groups per molecule.

Examples of suitable polycarboxylic acids include dicarboxylic acids such as saturated aliphatic dicarboxylic acids, for example, adipic acid and azelaic acid; aromatic acids such as phthalic acid; ethylenically unsaturated dicarboxylic acids such as fumaric acid and itaconic acid.

Besides the acids themselves, functional equivalents of the acids such as anhydrides where they exist and lower alkyl ($C_1$–$C_4$) esters of the acids can be used. Examples include succinic anhydride, phthalic anhydride and maleic anhydride.

Polycarboxylic acids or their functional equivalents having a functionality greater than two can also be used. Examples include trimellitic anhydride and polycarboxylic acids formed from reacting a dicarboxylic acid with a stoichiometric deficiency of a polyol having a functionality of 3 or more. For example, the reaction product of adipic acid with trimethylolpropane in a 3:1 molar ratio can be used. The resulting reaction product will have an acid functionality of 3.

Examples of suitable beta-hydroxyalkylamides are those of the structure:

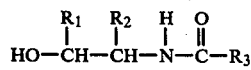

where $R_1$ and $R_2$ are hydrogen and $R_1$, $R_2$ and $R_3$ are selected from the class consisting of alkyl, cycloalkyl, aryl, alkaryl containing from 1 to 18 carbon atoms, including substituted radicals in which the substituents will not adversely affect the esterification reaction with the polycarboxylic acid or its functional equivalent thereof and will not adversely affect the transesterification curing reaction or the desirable properties of the coating composition. Examples of suitable radicals include alkyl such as methyl, ethyl and isobutyl.

The beta-hydroxyalkylamides of the above structure can be formed by reacting a beta-hydroxyamine with an ester, anhydride, or other functional equivalent of an organic monocarboxylic acid. Examples of beta-hydroxyamines are hydroxyethylamine, beta-hydroxypropylamine and 2-hydroxybutylamine. Examples of esters of organic monocarboxylic acids are alkyl esters of aliphatic monocarboxylic acids such as methyl, ethyl, hydroxyethyl and alkoxyethyl esters of acetic, propionic and isobutyric acids. The reaction conditions for forming the beta-hydroxyalkylamides are typical ammonialysis reaction conditions.

The crosslinking agent can be formed from reacting the polycarboxylic acid or its functional equivalent thereof with the beta-hydroxyalkylamide at an elevated temperature, usually reflux temperature, in the presence of a solvent, for example, an azeotropic solvent such as toluene or xylene. Reaction is continued with water being constantly removed until a low acid value, for example, 7 or less, is obtained.

The third component in the coating composition of the invention is a transesterification catalyst. These catalysts are known in the art and include salts or complexes of metals such as lead, zinc, iron, tin and manganese. Suitable salts and complexes include 2-ethylhexonates (octoates), naphthanates and acetyl acetonates.

The relative amounts of the polymeric polyol and the crosslinking agent which are present in the coating composition can vary between fairly wide limits depending upon the reactivity of the components and the time and temperature of curing and the properties desired in the cured coating. In general, the polymeric polyol will be present in amounts of about 20 to 95 percent, preferably about 50 to 85 percent by weight, and the crosslinking agent in amounts of about 5 to 80, preferably 15 to 50 percent by weight; the percentages by weight being based on total weight of polymeric polyol and crosslinking agent, and being determined on a solids basis.

The catalyst is present in amounts of about 0.1 to 2.0, preferably about 0.2 to 1.0 percent by weight metal based on total weight (solids) of the polymeric polyol and the crosslinking agent.

The polymeric polyol and the crosslinking agent described above can be formulated into the coating composition as two separate components such as would be the case using a crosslinking agent such as the adduct of N-(2-hydroxyethyl)isobutyramide and adipic acid in a 2:1 molar ratio. Alternately, the polymeric polyol and the crosslinking agent can be formulated into a coating composition as a one-component resin such as by forming a pre-condensate of the two. An example would be reacting a portion of the hyroxyl groups (or epoxy groups if present) of the polymeric polyol with a beta-amido half-ester of a dicarboxylic acid, for example, a 1:1 molar adduct of N-(2-hydroxyethyl)isobutyramide and adipic acid. The remaining portion of the hydroxy groups of the polymeric polyol would then be available for curing. Therefore, in the specification and claims in which the coating composition is set forth as comprising (A) a polymeric polyol and (B) a polyester crosslinking agent having at least two beta-amido ester groups per molecule, two-component systems in which (A) and (B) are present as separate ingredients as well as one-component systems in which (A) and (B) have been pre-reacted to form an essentially one-component resin are intended.

The components of the coating composition can be mixed simultaneously or in any order that is convenient. If the components are a liquid and of sufficiently low viscosity, they can be mixed together neat to form the coating composition. Alternately, if the components are higher viscosity liquids or solids, the components can be mixed with a diluent to reduce the viscosity of the composition so that it may be suitable for coating applications.

By liquid diluent is meant a solvent or a non-solvent which is volatile and which is removed after the coating is applied and is needed to reduce viscosity sufficiently to enable forces available in simple coating techniques, that is, brushing and spraying, to spread the coating to controllable, desired, and uniform thickness. Also, diluents assist in substrate wetting, resinous component compatibility and coalescence or film formation. Generally, when used, the diluent will be present in the composition in amounts of about 20 to 90, preferably 50 to 80 percent by weight based on total weight of the coating composition, although more diluent may be employed depending upon the particular coating application.

Examples of suitable liquid diluents for organic solvent-based coatings will depend somewhat on the particular system employed. In general, however, aromatic hydrocarbons such as toluene and xylene, ketones such as methyl ethyl ketone and methyl isobutyl ketone, alcohols such as isopropyl alcohol, normal butyl alcohol, monoalkyl ethers of glycols such as 2-alkoxyethanol, 2-alkoxypropanol and compatible mixtures of these solvents can be used.

Besides organic solvents, water can be used as a diluent either alone or in combination with water-miscible organic solvents. When water is used, the coating composition is usually modified such as by incorporating water-solubilizing groups such as the cationic groups mentioned above to provide for the necessary solubility in water. Besides the cationic groups mentioned above, other water-solubilizing groups such as non-ionic groups, for example, ethylene oxide groups, and anionic groups such as carboxylate salt groups may be introduced into the polymeric polyol or the polyester crosslinking agent to disperse or solubilize the coating composition in water.

The coating compositions of the invention may also optionally contain a pigment. Pigments may be of any conventional type, comprising, for example, iron oxides, lead oxides, strontium chromate, carbon black, coal dust, titanium dioxide, talc, barium sulfate, as well as color pigments such as cadmium yellow, cadmium red, chromium yellow and metallic pigments such as aluminum flake.

The pigment content of the coating composition is usually expressed as the pigment-to-resin weight ratio. In the practice of the present invention, pigment-to-resin weight ratios can be as high as 2:1, and for most pigmented coatings, are usually within the range of about 0.05 to 1:1.

In addition to the above ingredients, various fillers, plasticizers, anti-oxidants, ultraviolet light absorbers, flow control agents, surfactants and other formulating additives can be employed if desired. These materials are optional and generally constitute up to 30 percent by weight of the coating composition based on total solids.

The coating compositions of the invention can be applied by conventional methods including brushing, dipping, flow coating, spraying, and, for aqueous-based compositions containing ionic salt groups, by electrodeposition. Usually, they can be applied virtually over any substrate including wood, metal, glass, cloth, leather, plastic, foam and the like, as well as over various primers. For electroconductive substrates such as metals, the coatings can be applied by electrodeposition. In general, the coating thickness will vary somewhat depending upon the application desired. In general, coatings from about 0.1 to 10 mils can be applied and coatings from about 0.1 to 5 mils are usual.

When aqueous dispersions of the coating composition are employed for use in electrodeposition, the aqueous dispersion is placed in contact with an electrically conductive anode and an electrically conductive cathode. In the case of cationic electrodeposition, the surface to be coated is the cathode. Following contact with the aqueous dispersion, an adherent film of the coating composition is deposited on the electrode being coated when a sufficient voltage is impressed between the electrodes. Conditions under which electrodeposition is carried out are known in the art. The applied voltage may be varied and can be, for example, as low as 1 volt or as high as several thousand volts, but is typically between 50 and 500 volts. Current density is usually between 1.0 ampere and 15 amperes per square foot and tends to decrease during electrodeposition indicating the formation of an insulating film.

After the coating has been applied, it is cured by heating at elevated temperatures such as at about 150° to 205° C. for about 10 to 45 minutes to form solvent-resistant coatings. By solvent-resistant coatings is meant that the coating will be resistant to acetone, for example, by rubbing across the coating with an acetone-saturated cloth. Coatings which are not cured or poorly cured will not withstand the rubbing action with acetone and will be removed with less than 10 acetone double rubs. Cured coatings, on the other hand, will withstand 40 acetone double rubs, and preferably at least 100 acetone double rubs.

Illustrating the invention are the following examples which, however, are not to be construed as limiting the invention to their details. All parts and percentages in the examples, as well as throughout the specification, are by weight unless otherwise indicated.

EXAMPLE I

The following example shows the preparation of a coating composition containing a crosslinking agent having two beta-amido ester groups per molecule. The crosslinking agent was prepared by reacting N-(2-hydroxyethyl)isobutyramide with a condensate of trimethylolpropane and trimellitic anhydride. The crosslinking agent was mixed with a polymeric polyol made from condensing an epoxy resin (polyglycidyl ether of a polyphenol) with an amine. The mixture was formulated into a coating composition with lead octoate catalyst and the composition drawn down on steel panels to form coatings. The coatings were heated to give solent-resistant coatings.

N-(2-hydroxyethyl)isobutyramide

N-(2-hydroxyethyl)isobutyramide was prepared as follows:

| Ingredient | Weight (in grams) | Solids (in grams) | Equivalents | Moles |
|---|---|---|---|---|
| Isobutyric acid | 440.0 | 440.0 | 4.994 | 4.994 |
| 2-ethoxyethanol | 495.0 | 450.0 | 5.500 | 5.500 |
| Xylene | 80.0 | | | |
| Para-toluenesulfonic acid | 2.0 | 2.0 | | |
| Ethanolamine | 305.0 | 305.0 | 5.000 | 5.000 |

The isobutyric acid, 2-ethoxyethanol, xylene and para-toluenesulfonic acid were charged to a reaction vessel under a nitrogen blanket and a Dean-Stark trap and heated to reflux. The reaction mixture was held at reflux temperature (165° C.) until an acid value of 3.4 was obtained (123 grams of aqueous phase collected). The reaction mixture was cooled to 100° C., the ethanolamine was added and refluxing was continued for 9 hours. At that point, the reaction mixture was sparged until 447 grams of distillate was obtained. The product formed a dark brown, wet crystalline mass on standing overnight. This was recrystallized from ethanol and toluene to obtain 231.8 grams (35.4 percent yield, which could be increased with subsequent crops) of off-white needle crystals, mp 54°–57° C.

| | Crosslinking Agent | | | |
|---|---|---|---|---|
| Ingredient | Weight (in grams) | Solids (in grams) | Equivalents | Moles |
| Trimellitic anhydride | 131.9 | 131.9 | 2.061 | 0.687 |
| Trimethylolpropane | 30.7 | 30.7 | 0.687 | 0.229 |
| N—(2-hydroxyethyl)-isobutyramide | 180.0 | 180.0 | 1.374 | 1.374 |
| Xylene | 80.0 | | | |

The trimellitic anhydride, trimethylolpropane and the xylene were charged to a reaction vessel under a nitrogen blanket and a Dean-Stark trap and held at reflux for 30 minutes. The reaction mixture was then cooled to 100° C., the amido alcohol was added, and refluxing was continued until an acid value of 3.2 was obtained. The product was found to have a solids content of 81.7 percent.

Polymeric Polyol

The polymeric polyol was formed by chain extending an epoxy resin with a polyester diol and then reacting the chain-extended polyester with a mixture of amines, one of which included primary amine groups blocked with ketimine.

| Ingredient | Weight (in grams) | Solids (in grams) | Equivalents | Moles |
|---|---|---|---|---|
| EPON 828[1] | 1686.2 | 1686.2 | 8.674 (epoxy) | 4.337 |

| Ingredient | Weight (in grams) | Solids (in grams) | Equivalents | Moles |
|---|---|---|---|---|
| PCP 0200[2] | 588.4 | 588.4 | 2.160 (OH) | 1.080 |
| Xylene | 144.0 | | | |
| Bisphenol A | 494.5 | 494.5 | 4.337 (OH) | 2.169 |
| Benzyldimethylamine | 10.6 | | | |
| 2-ethoxyethanol | 572.2 | | | |
| Methylisobutyl diketimine of diethylene triamine[3] | 150.2 | 111.4 | 0.417 (amine) | 0.417 |
| Methylethanolamine | 125.1 | 125.1 | 1.668 (amine) | 1.668 |

[1]Polyglycidyl ether of bisphenol A having an epoxide equivalent of about 198 commercially available from Shell Chemical Company.
[2]Polycaprolactone diol having a molecular weight of about 545 commercially available from the Union Carbide Company.
[3]Solution in methylisobutyl ketone.

The EPON 828, PCP 0200 and xylene were charged to a reaction vessel and heated under a nitrogen blanket to reflux and held for 30 minutes. The reaction mixture was cooled to 155° C., followed by the addition of the bisphenol A. Benzyldimethylamine (3.4 grams) was added and the reaction mixture exothermed. The reaction mixture was cooled to 130° C., followed by the addition of the remaining benzyldimethylamine and the reaction mixture held at 130° C. until it attained a reduced Gardner-Holdt viscosity (50 percent resin solids in 2-ethoxyethanol) of N+. The 2-ethoxyethanol, diketimine and methylethonolamine were then added and the reaction mixture held at 110° C. for about one hour to complete the reaction.

To 34.78 parts by weight of the polymeric polyol reaction mixture prepared as described above were added 17.43 parts by weight of the crosslinking agent and 7.87 grams of 2-ethoxyethanol. The mixture was heated and stirred until homogeneous to form a coating composition. A portion of this mixture was put aside and the remaining portion (27.70 grams) was blended with 0.44 grams of lead octoate (0.33 grams solids). Both coating compositions were drawn down over untreated and zinc phosphate pretreated steel panels. The coated panels were then baked at 350° F. (177° C.) for 30 minutes. The coatings obtained from the compositions which contained no lead exhibited practically no acetone resistance (13-15 acetone double rubs). However, the coatings obtained from compositions containing the lead catalyst exhibited 75 acetone double rubs on the untreated steel and 60 acetone double rubs on the zinc phosphate pretreated steel panels.

I claim:

1. A coating composition which is heat curable to give a solvent-resistant coating comprising:
   (A) a polymeric polyol,
   (B) a crosslinking agent having at least two beta-amido ester groups per molecule,
   (C) a transesterification catalyst.

2. The composition of claim 1 in which the beta-amido ester is formed from reacting:
   (A) a polycarboxylic acid or its functional equivalent thereof with
   (B) a beta-hydroxyalkylamide.

3. The composition of claim 2 in which the beta-hydroxyalkylamide is of the structure:

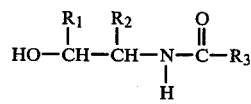

where $R_1$ and $R_2$ are hydrogen and $R_1$, $R_2$ and $R_3$ are selected from the class consisting of alkyl, cycloalkyl, aryl, alkaryl including substituted radicals in which the substituents will not adversely affect the esterification reaction with the polycarboxylic acid or its functional equivalent thereof and will not adversely affect the transesterification curing reaction or the desirable properties of the coating composition.

4. The composition of claim 2 in which the polycarboxylic acid or its functional equivalent thereof is selected from the class consisting of trimellitic anhydride, phthalic anhydride and adipic acid.

5. The composition of claim 1 in which the polymeric polyol has a hydroxyl value of at least 170.

6. The composition of claim 1 in which the polymeric polyol has a hydroxyl value within the range of 180 to 300.

7. The composition of claim 1 in which the polymeric polyol is selected from the class consisting of:
   (A) a polyglycidyl ether of a cyclic polyol,
   (B) the reaction product of a polyglycidyl ether of a cyclic polyol with an amine,
   (C) the at least partially acid-neutralized reaction product of a polyglycidyl ether of a cyclic polyol with an amine.

8. The composition of claim 1 which is dispersed in aqueous medium and in which the polymeric polyol contains cationic salt groups.

9. The composition of claim 8 in which the cationic salt groups are amine salt groups or quaternary ammonium base groups.

* * * * *